United States Patent
Cowley et al.

(10) Patent No.: US 8,290,448 B2
(45) Date of Patent: Oct. 16, 2012

(54) APPARATUS AND METHODS FOR MINIMIZING PERFORMANCE LOSS IN MULTIPLE TUNER SOLUTIONS

(75) Inventors: Nicholas Cowley, Wroughton (GB); William Barber, Bampton (GB); Clive Powell, Swindon (GB)

(73) Assignee: Intel Corporation, Santa Clara, CA (US)

( * ) Notice: Subject to any disclaimer, the term of this patent is extended or adjusted under 35 U.S.C. 154(b) by 198 days.

(21) Appl. No.: 12/752,569

(22) Filed: Apr. 1, 2010

(65) Prior Publication Data

US 2011/0244812 A1 Oct. 6, 2011

(51) Int. Cl.
*H04B 1/40* (2006.01)
(52) U.S. Cl. .............. 455/77; 455/150.1; 455/188.1
(58) Field of Classification Search .......... 455/77, 455/150.1, 188.1, 191.1, 255, 313
See application file for complete search history.

(56) References Cited

U.S. PATENT DOCUMENTS 4,661,995 A * 4/1987 Kashiwagi ............. 455/183.2
6,163,687 A * 12/2000 Scott et al. ................ 455/316

OTHER PUBLICATIONS

Cowley et al., U.S. Appl. No. 12/456,930, titled "Apparatus and Methods for Implementing Multi-channel Tuners", filed Jun. 23, 2009.
Cowley et al., U.S. Appl. No. 12/459,006, titled "Apparatus and Methods for Efficient Implementation of Tuners", filed Jun. 24, 2009.
Steeper et al., U.S. Appl. No. 12/456,865, titled "Apparatus and Methods for Minimizing Phase Interaction Between Multiple Tuner Solutions", filed Jun. 23, 2009.

* cited by examiner

*Primary Examiner* — Tuan H Nguyen
(74) *Attorney, Agent, or Firm* — Forefront IP Lawgroup, PLLC (57) ABSTRACT

Embodiments of systems and methods for implementing multi-channel tuners are generally described herein. Other embodiments may be described and claimed.

11 Claims, 4 Drawing Sheets

APPARATUS AND METHODS FOR MINIMIZING PERFORMANCE LOSS IN MULTIPLE TUNER SOLUTIONS

TECHNICAL FIELD

The present disclosure relates generally to the field of multimedia communications and more particularly to methods and related systems for mitigating performance loss in multi-tuner platforms.

BACKGROUND

Electronics devices for consumers and businesses include increasingly more diverse functionalities. Among the functions being provided in various electronic devices such as computer systems and set top boxes is the reception of a multimedia stream using radio frequency signals. A computing platform, such as a laptop computer, mobile internet device, station or client may provide a capability to process the multimedia stream using a tuner.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details for minimizing performance loss in electronic systems comprising multiple tuners are set forth to provide a thorough understanding of the invention. However, it will be understood by those skilled in the art that the present invention may be practiced without these specific details. In other instances, well-known methods, procedures, components and circuits have not been described in detail so as not to obscure the present invention.

It would be an advance in the art to provide an apparatus and methods for implementing a plurality of tuners, wherein the tuners can be independently tuned to any and all channels from a commonly received spectrum and wherein all or part of the tuning components are disposed on a common substrate in the same electronic system while avoiding intra-system interaction that can negatively affect performance.

Electronic systems including more than one tuner in the same platform or system are typically configured so that each tuner is independently isolated through application of electromagnetic coupling isolation. Application of the electromagnetic coupling isolation requires additional space and expense which is a burden, particularly in mobile devices designed with small form factors for low cost applications.

In embodiments where two or more tuners are proximately located on the same platform or substrate, commutating frequencies may be generated using multiple harmonic local oscillators. A commutating frequency is the frequency that will translate an input signal to the frequency to be delivered as an output. A local oscillator of a first tuner can leak to a radio frequency (RF) path of a second tuner and be converted by a harmonic of a commutating frequency of the second tuner to lie as a spur within a signal bandwidth of the second tuner. This spur can appear as an uncorrelated noise source, resulting in channel degradation of a desired channel. Mitigation of spurs generated through harmonic conversion can be especially important in instances where all or part of the components of the tuners and/or supporting components are located on a monolithic integrated circuit or disposed on a common substrate.

Some embodiments of the invention may be used in conjunction with various devices and systems, for example, a Personal Computer (PC), a set-top box, a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, or the like. Embodiments of the invention may be used in various other devices, systems and/or networks.

The terms "interference" or "noise" as used herein include, for example, random or non-random disturbances, patterned or non-patterned disturbances, unwanted signal characteristics, Inter Symbol Interference (ISI), electric noise, electric interference, white noise, non-white noise, signal distortions, shot noise, thermal noise, flicker noise, "pink" noise, burst noise, avalanche noise, noise or interference produced by components internal to a device attempting to receive a signal, noise or interference produced by co-existing components of a device attempting to receive a signal, noise or interference produced by components or units external to a device attempting to receive a signal, random noise, pseudorandom noise, non-random noise, patterned or non-patterned interference, or the like.

The term "mitigation" (e.g., of interference or noise) as used herein includes, for example, reduction, decrease, lessening, elimination, removal and/or avoidance.

The terms "television signal(s)" or "digital television signals" as used herein include, for example, signals carrying television information, signals carrying audio/video information, Digital Television (DTV) signals, digital broadcast signals, Digital Terrestrial Television (DTTV) signals, signals in accordance with one or more Advanced Television Systems Committee (ATSC) standards, Vestigial SideBand (VSB) digital television signals (e.g., 8-VSB signals), Coded OFDM (COFDM) television signals, Digital Video Broadcasting-Terrestrial (DVB-T) signals, DVB-T2 signals, Integrated Services Digital Broadcasting (ISDB) signals, digital television signals carrying MPEG-2 audio/video, digital television signals carrying MPEG-4 audio/video or H.264 audio/video or MPEG-4 part 10 audio/video or MPEG-4 Advanced Video Coding (AVC) audio/video, Digital Multimedia Broadcasting (DMB) signals, DMB-Handheld (DMB-H) signals, High Definition Television (HDTV) signals, progressive scan digital television signals (e.g., 720p), interlaced digital televisions signals (e.g., 1080i), television signals transferred or received through a satellite or a dish, television signals transferred or received through the atmosphere or through cables, signals that include (in whole or in part) non-television data (e.g., radio and/or data services) in addition to or instead of digital television data, or the like.

Among the television signals that may be utilized for video is the recent China digital television standard. The standard is designated number GB20600-2006 of the SAC (Standardization Administration of China), and is entitled "Framing Structure, Channel Coding and Modulation for Digital Television Terrestrial Broadcasting System", issued Aug. 18, 2006. The standard may also be referred to as DMB-T (Digital Multimedia Broadcasting-Terrestrial) or DMB-T/H (Digital Multimedia Broadcasting Terrestrial/Handheld). This standard will generally be referred to herein as "DMB-T".

Figure 1:
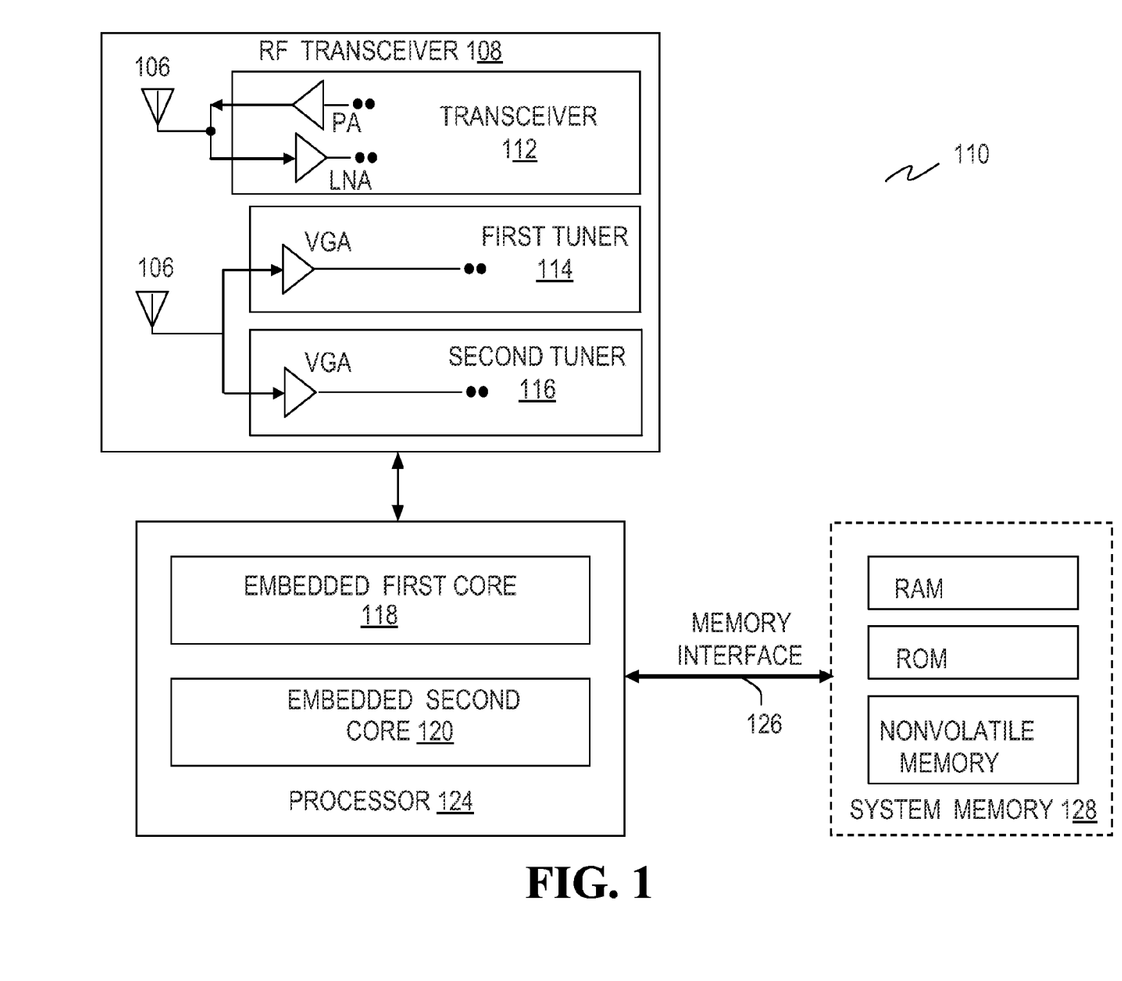
FIG. 1 is a block diagram of an electronic system in accordance with some embodiments of the invention.

Now turning to the Figures, an electronic system 110 incorporating a radio to allow communication with other over-the-air communication systems according to some embodiments of the invention is illustrated in FIG. 1. In another embodiment of the invention (not shown), the electronic system 110 is a wired communications system that is configured to allow communication with a wired and/or wireless communication device or devices. The electronic system 110 may operate in a number of networks such as, for example, Digital Video Broadcasting-Handheld (DVB-H) that brings broadcast services to handheld receivers as adopted in the ETSI standard EN 302 304; Digital Multimedia Broadcasting (DMB); Digital Video Broadcasting-Terrestrial (DVB-T); the Integrated Services Digital Broadcasting-Terrestrial (ISDB-T) in Japan; or Wireless Fidelity (Wi-Fi) that provides the underlying technology of Wireless Local Area Network (WLAN) based on the IEEE 802.11n specifications, although the present invention is not limited to operate in only these networks. Thus, the radio subsystems co-located in electronic system 110 provide the capability of communicating in an RF/location space with other devices in a network.

The simplistic embodiment illustrates an RF transceiver 108 with one or more antenna(s) 106 to receive network transmissions that are coupled to a transceiver 112 to accommodate modulation/demodulation. The antennas 106 also receive transmission for a first tuner 114 and a second tuner 116 to receive "data bits" used to make a TV picture and sound in the Digital television (DTV) broadcasting technology from a commonly received spectrum. Additional tuners may also be proximately positioned to the first tuner 114 and the second tuner 116 in alternate embodiments. The commonly received spectrum may be the same spectra, for example a terrestrial television transmission or independent spectra sharing common frequencies, for example terrestrial television transmissions and cable television transmissions. The commonly received spectrum may be an aggregated spectrum for example terrestrial and satellite, whereby terrestrial occupies 50 to 860 MHz and satellite 950 to 2150 MHz.

Each antenna 106 may comprise one or more directional or omnidirectional antennas, including, for example, dipole antennas, monopole antennas, patch antennas, loop antennas, microstrip antennas, or other types of antennas suitable for transmission of radio frequency (RF) signals. In some embodiments, instead of two or more antennas 106, a single antenna 106 with multiple apertures may be used. In these embodiments, each aperture may be considered a separate antenna 106. In some multiple-input, multiple-output (MIMO) embodiments, the RF transceiver 108 may use two or more of antennas 106 that may be effectively separated to take advantage of spatial diversity and the different channel characteristics that may result between each of the antennas 106 and one or more host transmission source(s) transmitting a transport stream. In some applications one or more of the tuners 114, 116 may also use two or more antennas 106 similarly separated to take advantage of spatial diversity gain.

Appropriate to received transport streams such as MPEG-2 and the different technical constraints of the received data, a demodulation scheme may be selected to provide the demodulated signals to a processor 124. By way of example, the receiver may include OFDM or OFDMA blocks with pilot signals and the digital demodulation schemes may employ QPSK, DQPSK, 16QAM and 64QAM, among other schemes. The analog transceiver 112, first tuner 114, and the second tuner 116 may be embedded with the processor 124 as a mixed-mode integrated circuit where baseband and applications processing functions may be handled by processor cores 118 and 120.

The processor 124 may transfer data through a memory interface 126 to memory storage in a system memory 128 comprising one or more of a volatile and/or nonvolatile memory for storage. For example, nonvolatile memory may include one or more of the following: read-only memory (ROM), programmable ROM (PROM), erasable PROM (EPROM), electrically EPROM (EEPROM), a disk drive or solid state drive (e.g., 128), a floppy disk, a compact disk ROM (CD-ROM), a digital versatile disk (DVD), flash memory, a solid-state drive (SSD), a magneto-optical disk, or other types of nonvolatile machine-readable media capable of storing electronic data including instructions.

The processor 124 as illustrated in this embodiment provides multiple core processors or central processing unit(s). The processor 124 may be any type of processor such as a general purpose processor, a network processor (which may process data communicated over a computer network), etc. (including a reduced instruction set computer (RISC) processor, an application specific integrated circuit (ASIC), or a complex instruction set computer (CISC)). In alternate embodiments, the processor 124 may have a single or quad core design. The processor 124 with a multiple core design may integrate different types of processor cores on the same integrated circuit (IC) die. Also, the processor 124 with a multiple core design may be implemented as symmetrical or asymmetrical multiprocessors.

Figure 2:
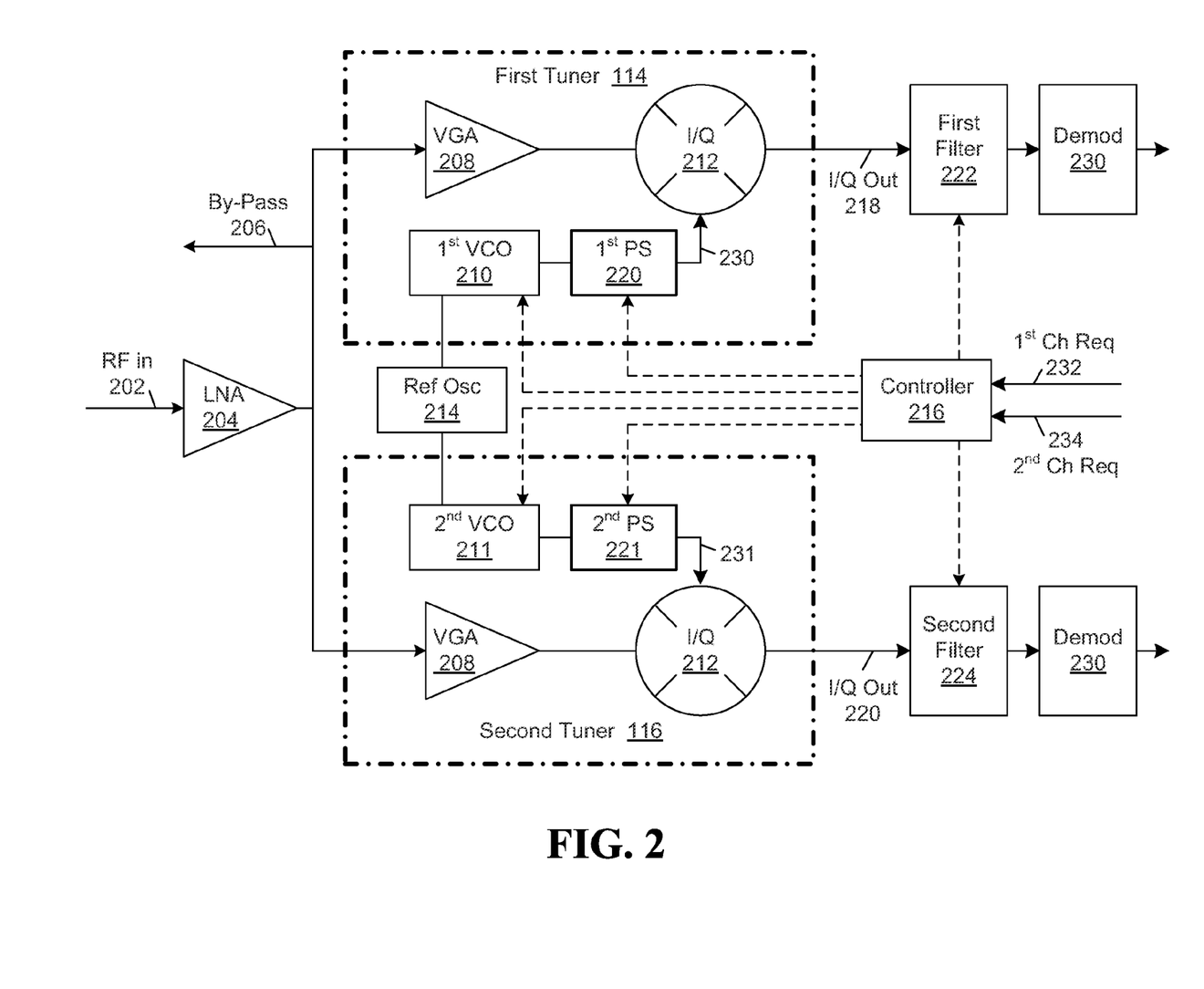
FIG. 2 is a block diagram of the electronic system in accordance with some embodiments of the invention.

FIG. 2 is a block diagram of the electronic system 110 in accordance with some embodiments of the invention. The first tuner 114 and the second tuner 116 are coupled to a common low noise amplifier (LNA) 204 to receive a radio frequency (RF) input 202. The RF input 202 may be delivered wirelessly and/or through a wired source. Two tuners 114, 116 are illustrated in FIG. 2, however additional tuners may also be connected and positioned proximate to the LNA 204. Further, the tuners including the first tuner 114 and the second tuner 116 may be disposed in whole or in part on a common substrate. Output from the LNA 204 is directed to the first tuner 114 and the second tuner 116 and is also provided to a by-pass 206 circuit. The by-pass circuit 206 may provide output to one or more additional tuners coupled to the electronic system 110.

In this embodiment, the first tuner 114 and the second tuner 116 each receive input provided by the low noise amplifier (LNA) 204 that is used to amplify the RF input 202 signal. The amplified signals from the LNA 204 may pass to one or more band pass filters (not shown) to suppress a leakage power of the transmission or receiver band interference. Output from the LNA 204 passes to a variable gain amplifier (VGA) 208 with a gain that is dependent on a control voltage. In another embodiment, the amplified signals from the LNA 204 may be passed to one or more fixed amplifiers.

The first tuner 114 further comprises a mixer 212 coupled to a first prescaler 220 and a first voltage controlled oscillator (VCO) 210. The first prescaler 220 divides the first VCO 210 frequency to a desired or first commutating frequency 230 provided to the mixer 212 in the first tuner 114 using a first prescaler ratio. The first prescaler ratio may be programmed or determined by the controller 216. The first VCO 210 receives a reference frequency from a reference oscillator (ref osc) 214, which may be a crystal oscillator circuit configured to provide a reference frequency signal in a given frequency range. In an embodiment, the ref osc 214 ranges between 25 to 32 MHz.

The second tuner 116 comprises a mixer 212 coupled to a second prescaler 221 and a second VCO 211 that also receives the reference frequency from the reference oscillator 214. Analogous to the first tuner 114, the second prescaler 221 divides the second VCO 211 frequency to a desired or second commutating frequency 231 provided to the mixer 212 in the second tuner 116 using a second prescaler ratio. The second prescaler ratio may be programmed or determined by the controller 216. The controller may also be coupled to a third tuner connected to the by-pass 206 to send a signal to a third VCO and/or a third prescaler (not shown), and be configured to receive a third channel request. Additional tuners may be similarly configured.

In an embodiment, a tuning range of the first VCO 210 and the second VCO 211 may be between 3 gigahertz (GHz) and 6 GHz, however alternate tuning ranges may be deployed to satisfy application, form factor, and performance considerations. For example, it may be necessary to shrink the first VCO 210 and/or the second VCO 211 for mobile or small form factor applications. Further, an octave tuning range may be maintained to simplify commutating frequency generation since it may be desirable to derive the commutating frequency using a 2*N division ratio divider or prescaler.

The first VCO 210 and the second VCO 211 are further coupled to a controller 216 wherein the controller 216 configures the first VCO 210 and the second VCO 211 to minimize or eliminate tuner-to-tuner interaction resulting from harmonically-related oscillator signals. The controller 216 may be the processor 124 of FIG. 1 or a separate controller in the form of a general purpose processor, a network processor (which may process data communicated over a computer network), etc. (including a reduced instruction set computer (RISC) processor, an application specific integrated circuit (ASIC), or a complex instruction set computer (CISC)).

Each VCO 210, 211 forms a periodic output signal wherein a frequency of the periodic output signal is set or established by a direct current (DC) control voltage applied using the controller 216 through a tuning input that is adjusted up or down to control a frequency of the periodic output signal of the VCOs 210, 211. A center frequency provided by the VCOs 210, 211 is the frequency of the periodic output signal formed by the VCOs 210, 211 when the control voltage is set to a nominal level. The control voltage of the VCOs 210, 211 may be generated at least in part by integrating an output of a phase detector of a synthesizer, wherein the synthesizer (not shown) compares the reference frequency from the ref osc 214 and an input from the VCOs 210, 211. The first VCO 210 and the first prescaler 220 of the first tuner 114 and the second VCO 211 and the second prescaler 221 of the second tuner 116 are configured to be programmed to provide a desired commutating frequency for the respective tuner 114 and 116. The commutating frequency is related to the VCO frequency by a divide by N ratio provided by the prescaler in this embodiment.

When the first VCO 210 of the first tuner 114 is placed in proximity to the second tuner 116, for example when commonly situated on a substrate or integrated circuit, and the first VCO 210 is tuned to the same or close to the same or a harmonic frequency as the first commutating frequency 230 of the first tuner 114, energy from the first VCO 210 that is coupled between the tuners 114 and 116 may be received and downconverted to lie in an output of the second tuner 116 by the second commutating frequency 231 or harmonic thereof of the second tuner 116, resulting in a tuner-to-tuner interaction.

To overcome or avoid this interaction, the controller 216 may predict the interaction and use a mechanism embodied in hardware or software that can predict and/or detect interaction between the tuners. The mechanism provides a means for calculating an occurrence of the interference between the two or more tuners. A level of interference generated is determined by the level of VCO energy coupling between the tuners 114 and 116, the bandwidth of the LNA and/or VGA 208 and the Fourier harmonic content of a victim tuner, wherein one tuner 114 or 116 is the victim tuner and the other tuner 114 or 116 is the aggressor tuner.

The controller 216 may provide a means for configuring a tuner such as the second tuner 116, which is being tuned to avoid interaction with the first tuner 114 which is not being tuned, by predicting whether a VCO frequency generated by the second tuner 116 will create an in-band spur in a channel of the first tuner 114 and selecting a prescaler ratio $2_N$ for the second tuner 116 such that the resulting VCO frequency will no longer lie at or close to the first commutating frequency 230 or harmonic thereof of the first tuner 114 and so will not generate the in-band spur in the channel of the first tuner 114. The prediction may be performed using the controller 216 or another logic device or input coupled to the first tuner 114 and the second tuner 116.

The controller 216 may provide a means for offsetting the second VCO 211 in a controlled manner to minimize or avoid spurious signals in an output of the first tuner 114 by moving the spurs to a non-interfering frequency, such as a channel center or outside a band edge of the channel of the first tuner 114, and for adjusting the bandwidth of the second tuner 116 to allow channel information to pass un-attenuated. In these embodiments, an output from the second tuner 116 is fixed or static and an output from the first tuner 114 is retuned, wherein both tuners are locked to the same reference frequency provided by the ref osc 214. Further, an occurrence of in-band spurs created in a channel of either the first tuner 114 or the second tuner 116 may be predicted by the controller 216.

The mixer 212 is provided to receive and combine an RF signal from the VGA 208 with a frequency signal from its respective VCO & prescaler to provide an in-phase ($I_{in}$) signal and a Quadrature ($Q_{in}$) signal. The first tuner 114 provides a first I/Q output (I/Q out) 218 to a first filter 222 and the second tuner 116 provides a second I/Q out 220 to a second filter 224, wherein the first filter 222 and the second filter 224 are channel filters coupled to the controller 216. A demodulator 230 is connected to its respective filter and the demodulator 230 may be configured to remove an offset in an output provided by the channel filter. Desired channel frequencies may be provided to the controller 216 by a first channel request ($1^{st}$ Ch Req) 232 and a $2^{nd}$ Ch Req 234.

In an embodiment, the first tuner 114 receives an 8 megahertz (MHz) channel with a center frequency of 723 MHz. In this embodiment, the first commutating frequency 230 of the first tuner 114 is 723 MHz with the first VCO 210 operating at 4338 MHz and a prescale ratio of 6 provided by the first prescaler 220 and the controller 216. The second tuner 116 is re-tuned from an initial starting point to a channel centered on 201 MHz. The second commutating frequency 231 of the second tuner 116 is 201 MHz, which may be derived from the second VCO 211 operating at 3618 MHz or 4824 MHz with a prescale ratio of 18 and 24 respectively provided by the second prescaler 221. The second prescaler 221 prescale ratio is programmed or determined by the controller 216.

In this example, the first commutating frequency 230 of the first tuner 114 will have harmonics of 3, 5, 7, 9 that correspond respectively to 2169, 3615, 5061, 6507 MHz. If the second VCO 211 is operating at 3618 MHz, the second VCO 211 is offset by only 3 MHz from the fifth harmonic of the commutating frequency of the first tuner 114 at 3615 MHz. It is predicted that an in-band spur will be generated in the output or a channel of the first tuner 114 due to leakage of the VCO operating frequency of the second VCO 211 of the second tuner 116 into the RF input of the first tuner 114 and being converted by the $5^{th}$ harmonic of the first commutating frequency 230.

In response, another operating frequency of the second VCO 211 of the second tuner 116 is selected that does not generate the in-band spur in the output channel of the first tuner 114. For example, if 4824 MHz is selected as the VCO operating frequency of the second VCO 211, then the VCO operating frequency is offset from the seventh harmonic of the first commutating frequency 230, which is 5061 MHz, by 237 MHz. It is predicted by the controller 216 that the selection of 4824 MHz as the VCO operating frequency of the second VCO 211 will not form an in-band spur in the output channel of the first tuner 114.

Figure 3:
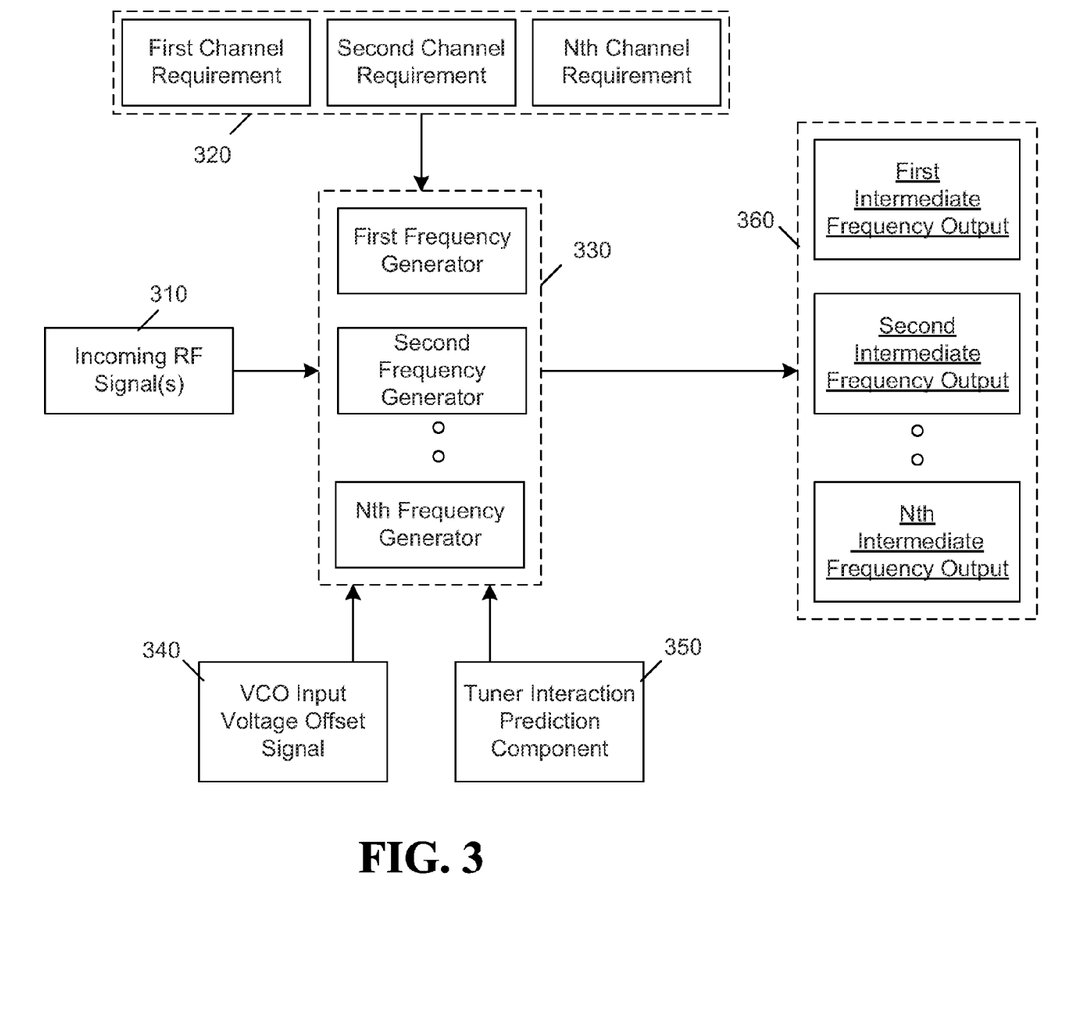
FIG. 3 is a block diagram of the electronic system accordance with some embodiments of the invention.

FIG. 3 is a block diagram of the electronic system 110 of FIG. 1 in accordance with some embodiments of the invention. Incoming RF signals 310 are received by the electronic system 110. The electronic system 110 is configured with multiple tuners including the first tuner 114 and the second tuner 116 to receive one or more channel requirements 320 from one or more sources such as a user, an electronic source such as a digital video recorder (DVR), a networked source, and/or another source.

A plurality of frequency generators 330 represents the plurality of tuners (e.g. first tuner 114 & second tuner 116) or components thereof, each tuner comprising the VGA 208, the mixer 212, and a VCO (e.g. first VCO 210 & second VCO 211) connected to a reference oscillator 214. One or more outputs of the plurality of frequency generators 330 are modified by a VCO input voltage offset signal 340 embodied as a logic block or software subroutine, and a tuner interaction prediction component 350 which may be embodied in hardware and/or software form. For example, the VCO input voltage offset 340 and tuner interaction prediction component 350 may be software subroutines processed on the controller 216 of FIG. 2. Outputs from the frequency generators 330 are provided in the form of intermediate frequency outputs 360 to accommodate the channel requirements 320. In another embodiment, the outputs 360 may be in the form of ZIF outputs.

In one embodiment, interaction may be mitigated between tuners such as the first tuner 114 and the second tuner 116 when receiving a channel request or channel requirement 320 by using the tuner interaction prediction component 350 to determine an operating frequency of a local oscillator of the second tuner 116 based at least on available oscillator frequencies available to the second VCO 211 and determination of a commutating frequency and harmonics thereof of the first tuner 114. An operating frequency of the oscillator of the second tuner 116 could be selected to avoid potential spurs in a channel of the first tuner.

A method for tuning a multi-tuner electronic system 110 comprising two or more tuners may comprise determining a first commutating frequency 230 of the first tuner 114. The first commutating frequency 230 is the frequency that will translate an input signal such as the RF in 202 of FIG. 1 to an output signal or to a channel provided by the first tuner 114. The first commuting frequency is provided by a local oscillator and prescaler such as the first VCO 210 and first prescaler 220. A channel request for a second tuner 116 is received by the electronic system 110 and a second commutating frequency 231 of the second tuner 116 is selected based at least in-part on the channel request. Available operating frequencies for a second oscillator, such as the second VCO 211, of a second tuner 116 are determined and an available operating frequency of the second oscillator is selected based at least in-part on the second commutating frequency 231 of the second tuner 116. A calculation or a determination is performed to predict if the operating frequency of the second oscillator will generate an in-band spur in the channel provided by the first tuner 114. An operating frequency of the second oscillator that does not generate the in-band spur in the channel of the first tuner 114 is selected. The channel provided by the first tuner may have a bandwidth of 8 MHz for DVB cable, or DVB-C. Channels that comply with alternate TV standards having bandwidths of 5, 6, and 7 MHz may also be used in alternate embodiments.

In another embodiment, a method for tuning a multi-tuner electronic system 110 comprises determining an operating frequency of a first oscillator, such as the first VCO 210 of the first tuner 114. A second commutating frequency of the second tuner 116 is determined. The second commutating frequency is the frequency that will translate an input signal such as the RF in 202 to an output signal or channel provided by the second tuner 116. The second commuting frequency is provided by a local oscillator such as the second VCO 211 and second prescaler 221. It is predicted whether the operating frequency of the first oscillator will generate an in-band spur in a channel provided by the second tuner 116.

If it is predicted that an in-band spur will be generated, then the second commutating frequency is modified or adjusted to offset the in-band spur of the second tuner 116. The second commutating frequency may be adjusted so that the in-band spur is offset to a center of the channel in an architecture using zero intermediate frequency (ZIF) provided by the second tuner 116. In this case, since the reference frequency provided by the ref osc 214 is locked, the harmonic will be converted to DC and be rejected by a DC rejection associated with a baseband section of the ZIF architecture.

A filter element, such as the second filter 224, which may be a standalone channel filter or part of the demodulator 230 is adjusted in response to the modification of the second commutating frequency 231. The filter element may be adjusted with use of a processor or the controller 216. In another embodiment, the second commutating frequency may be adjusted to shift the in-band spur out of the band of the channel provided by the second tuner 116. In this embodiment, the spur is rejected by the filtering provided by the second filter 224 and filtering within the demodulator 230.

In a further embodiment, there is a possibility that all available frequencies provided by a local oscillator of the second tuner 116 would result in an in-band spur on a channel provided by the first tuner 114. In this example, channel offsetting as described in the previous embodiment can be applied.

Figure 4:
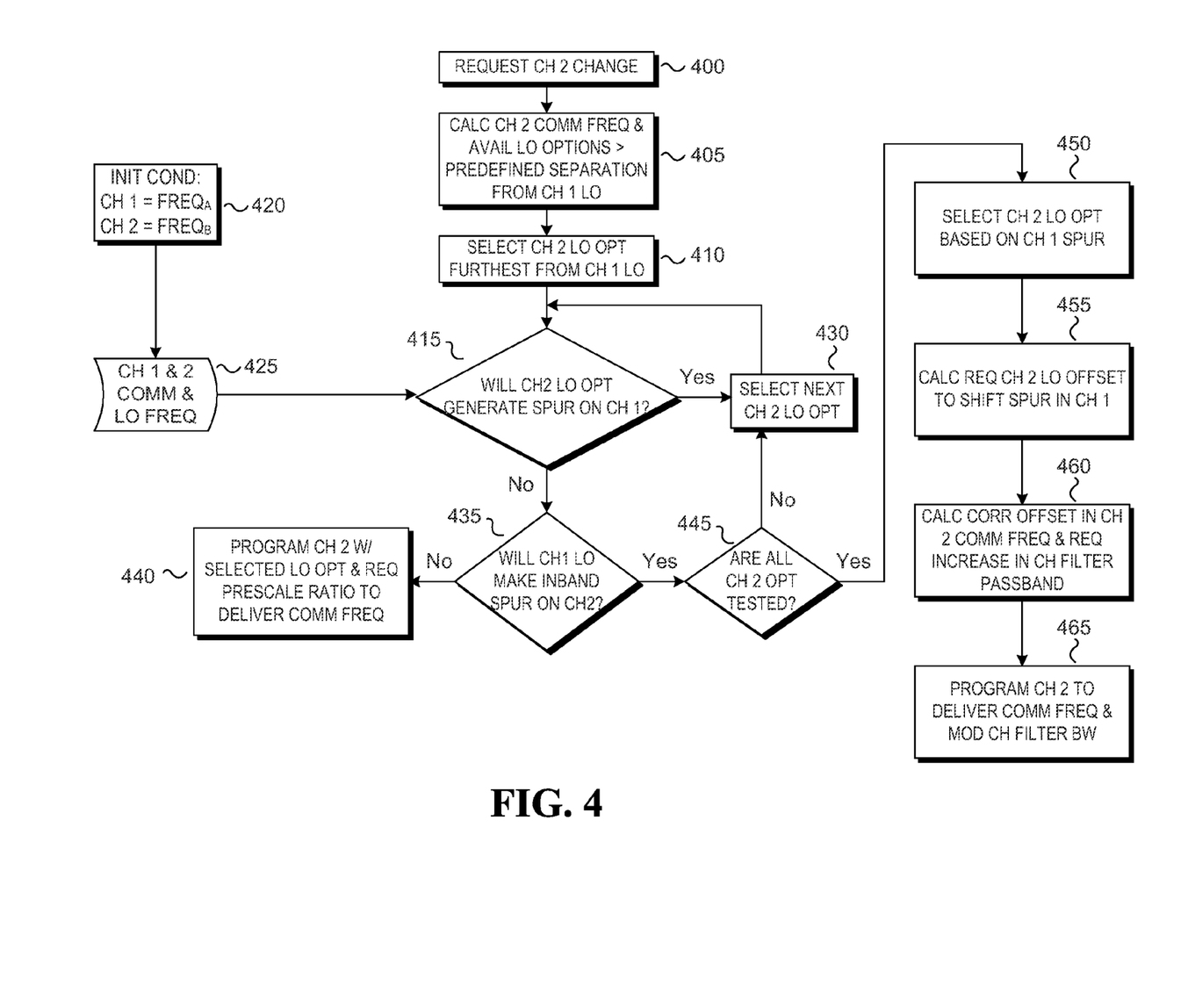
FIG. 4 is a flowchart that describes an embodiment of a method for mitigating performance loss between multiple tuners.

FIG. 4 is a flowchart that describes a method for mitigating performance loss between multiple tuners. In element 400, a request to change a channel provided by a second tuner 116 is received. A commutating frequency for the production of the channel provided by the second tuner 116 is calculated in element 405 and compared against available frequencies provided by a second local oscillator, such as the second VCO 211, including a predefined separation from a frequency provided by a local oscillator of the first tuner 114. The frequency provided by the local oscillator of the second tuner 116 that has the greatest separation from the frequency provided by the local oscillator of the first tuner 114 is selected in element 410.

In element 415, it is determined whether the frequency generated by the local oscillator of the second tuner 116 would generate a spur in the channel provided by the first tuner 114. To make this determination, in element 420 the frequencies of the first channel and/or the second channel are determined. The commutating frequencies and local oscillator frequencies of the first tuner 114 and/or the second tuner 116 are determined in element 425. If the frequency generated by the local oscillator of the second tuner 116 will generate a spur in the channel provided by the first tuner 114, then another local oscillator frequency for the second tuner 116 will be selected in element 430.

If the frequency generated by the local oscillator of the second tuner 116 will not generate a spur the channel provided by the first tuner 114, then it is determined in element 435 whether a local oscillator frequency of the first tuner 114 will generate a spur in the channel provided by the second tuner 116. If a local oscillator frequency of the first tuner 114 will not make a spur in the channel provided by the second tuner 116, then the second tuner 116 will be programmed in element 440 to provide the selected option for the local oscillator of the second tuner 116 while requesting an appropriate prescale ratio to deliver a desired commutating frequency of the second tuner 116.

If a local oscillator frequency of the first tuner 114 will generate a spur in the channel provided by the second tuner 116, then it is determined in element 445 whether all options for a channel provided by the second tuner 116 have been tested. If not, then a next local oscillator option is selected in element 430. If all options for a channel provided by the second tuner 116 have been tested, then a selection of a frequency provided by the local oscillator of the second tuner 116 is selected in element 450 based at least in-part on a spur created in a channel of the second tuner 116.

In element 455, an offset is applied to a frequency provided by the local oscillator of the second tuner 116 to shift the spur created in a channel of the second tuner 116. Further, a corrective offset is calculated in element 460 for the channel provided by the second tuner 116 and a modification is requested in the channel filter passband of the second filter 224 for the second channel. In element 465, the second channel is adjusted by the prescribed offset and prescale ratio to provide the commutating frequency of the second tuner 116 along with the modified channel filter bandwidth for the second channel provided by the second tuner 116.

Embodiments may be described herein with reference to data such as instructions, functions, procedures, data structures, application programs, configuration settings, etc. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by the electronic system 110, performs multi tuner capability without tuner to tuner interaction. The programs in the electronic system 110 may be considered components of a software environment.

The operation discussed herein may be generally facilitated via execution of appropriate firmware or software embodied as code instructions on the controller 116 of the electronic system 110, as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include a tangible article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method for tuning a multi-tuner electronic system, comprising: determining a harmonic frequency of a first commutating frequency of a first tuner; receiving a channel request for a second tuner; determining a second commutating frequency of the second tuner based at least in-part on the channel request; predicting if an operating frequency of an oscillator of the second tuner will generate an in-band spur within a signal bandwidth of the first tuner; selecting the operating frequency of the oscillator of the second tuner based at least in part on the in-band spur created on the signal bandwidth of the first tuner, wherein a difference between the operating frequency of the second tuner and the harmonic of the first commutating frequency is greater than half the signal bandwidth of the first tuner.

2. The method of claim 1, further including changing a prescaler ratio to provide the second commutating frequency.

3. The method of claim 2, further including using a controller to select another operating frequency of the oscillator of the second tuner and to change the prescaler ratio to provide the second commutating frequency.

4. The method of claim 1 wherein the first tuner and the second tuner are located on the same substrate or integrated circuit.

5. The method of claim 1, further comprising communicating in a Wi-Fi network using a transceiver.

6. A method for tuning a multi-tuner electronic system, comprising:
   determining a first commutating frequency of a first tuner;
   receiving a channel request for a second tuner;
   determining a second commutating frequency of the second tuner based at least in-part on the channel request;
   modifying an operating frequency of an oscillator of the second tuner, wherein a difference between the operating frequency of the oscillator of the second tuner and harmonics of the first commutating frequency is greater than half of signal bandwidth of the first tuner; and
   adjusting a filter element coupled to the second tuner in response to the operating frequency modification of the oscillator of the second tuner.

7. The method of claim 6, further comprising:
   selecting the operating frequency of the oscillator of the second tuner based at least in-part on the second commutating frequency of the second tuner;
   predicting if the operating frequency of the oscillator of the second tuner will generate an in-band spur in a channel of the first tuner; and
   selecting another operating frequency of the oscillator of the second tuner that does not generate the in-band spur in the channel of the first tuner.

8. The method of claim 7, wherein the second commutating frequency is offset to a center of the channel of the second tuner.

9. The method of claim 7, wherein the second commutating frequency is modified to offset the in-band spur outside the signal bandwidth of the second tuner.

10. The method of claim 7, wherein the filter element is adjusted to maintain signal integrity for the channel of the second tuner.

11. The method of claim 7 wherein the first tuner and the second tuner are located on the same substrate or integrated circuit.

* * * * *